United States Patent
Pope et al.

(10) Patent No.: US 10,769,474 B2
(45) Date of Patent: Sep. 8, 2020

(54) KEYPOINT DETECTION CIRCUIT FOR PROCESSING IMAGE PYRAMID IN RECURSIVE MANNER

(71) Applicant: Apple Inc., Cupertino, CA (US)

(72) Inventors: David R. Pope, Fremont, CA (US); Cecile Foret, Palo Alto, CA (US); Jung Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 16/101,138

(22) Filed: Aug. 10, 2018

(65) Prior Publication Data

US 2020/0050880 A1    Feb. 13, 2020

(51) Int. Cl.
*G06K 9/32* (2006.01)
*H04N 5/232* (2006.01)
*G06K 9/46* (2006.01)

(52) U.S. Cl.
CPC .......... *G06K 9/3241* (2013.01); *G06K 9/4671* (2013.01); *H04N 5/23267* (2013.01); *G06K 2009/4666* (2013.01); *G06T 2207/20* (2013.01)

(58) Field of Classification Search
CPC ............... G06K 9/3241; G06K 9/4671; G06K 2009/4666; H04N 5/23267; G06T 2207/20
USPC ........................................................ 382/255
See application file for complete search history.

(56) References Cited

U.S. PATENT DOCUMENTS

| | | | |
|---|---|---|---|
| 8,625,902 B2 | 1/2014 | Baheti et al. | |
| 8,712,162 B2 | 4/2014 | Kirsch | |
| 9,495,591 B2 | 11/2016 | Visser et al. | |
| 9,710,896 B2 | 7/2017 | Lim et al. | |
| 9,747,516 B2 | 8/2017 | Wagner et al. | |
| 2009/0324087 A1* | 12/2009 | Kletter | G06K 9/4671 382/195 |
| 2010/0080469 A1* | 4/2010 | Liu | G06K 9/4671 382/201 |
| 2010/0310174 A1* | 12/2010 | Reznik | G06K 9/4642 382/190 |
| 2011/0255781 A1* | 10/2011 | Hamsici | G06K 9/4671 382/170 |
| 2012/0109993 A1* | 5/2012 | Reznik | G06F 16/583 707/765 |
| 2012/0183224 A1* | 7/2012 | Kirsch | G06K 9/4619 382/195 |
| 2013/0243330 A1* | 9/2013 | Chiu | G06K 9/4671 382/195 |
| 2016/0004930 A1* | 1/2016 | Gutelzon | G06K 9/4671 382/195 |

(Continued)

*Primary Examiner* — Juan A Torres
(74) *Attorney, Agent, or Firm* — Fenwick & West LLP

(57) ABSTRACT

Embodiments relate a keypoint detection circuit for identifying keypoints in captured image frames. The keypoint detection circuit generates an image pyramid based upon a received image frame, and determine multiple sets of keypoints for each octave of the pyramid using different levels of blur. In some embodiments, the keypoint detection circuit includes multiple branches, each branch made up of one or more circuits for determining a different set of keypoints from the image, or for determining a subsampled image for a subsequent octave of the pyramid. By determining multiple sets of keypoints for each of a plurality of pyramid octaves, a larger, more varied set of keypoints can be obtained and used for object detection and matching between images.

20 Claims, 8 Drawing Sheets

(56) References Cited

U.S. PATENT DOCUMENTS

2018/0007334 A1 1/2018 Lim et al.
2019/0205693 A1* 7/2019 Zhu .................... G06K 9/4633

* cited by examiner

KEYPOINT DETECTION CIRCUIT FOR PROCESSING IMAGE PYRAMID IN RECURSIVE MANNER

BACKGROUND

1. Field of the Disclosure

The present disclosure relates a circuit for processing images and more specifically to a circuit for detecting keypoints in received images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to a keypoint detection circuit for identifying keypoints in captured image frames. The keypoint detection circuit generates an image pyramid based upon a received image frame and determines multiple sets of keypoints for each octave of the pyramid using different levels of blur. In some embodiments, the keypoint detection circuit includes multiple branches, each branch made up of one or more circuits for determining a different set of keypoints from the image, or for determining a subsampled image for a subsequent octave of the pyramid. By determining multiple sets of keypoints for each of a plurality of pyramid octaves, a larger, more varied set of keypoints can be obtained and used for object detection and matching between images.

In some embodiments, the keypoint detection circuit comprises three branches made up of first and second keypoint generation circuits, and a filter and decimation circuit. The first keypoint generation circuit configured to generate a first response map by blurring image data to a first blur level in a first octave followed by further processing, and to generate a first set of keypoints from the first response map. In addition, in a second octave subsequent to the first octave, the first keypoint generation circuit may blur a downscaled version of the image to a second blur level, compute a second response map and generate a second set of keypoints from the second response map. The second keypoint generation circuit, in a first octave, generates a third blurred image by blurring the image data to a second blur level in the first octave (third blur level total), computes a third response map, and a third set of keypoints from the third response map. During the second octave, the second keypoint generation circuit generates a fourth response map by blurring the downscaled version of the image to a second blur level in the second octave, fourth blur level in total, performing response map calculations on the blurred image and computing a fourth set of keypoints from the fourth response map. The filter and decimation circuit generates the downscaled version of the image data from the image data, to be used for the second octave.

BRIEF DESCRIPTION OF THE DRAWINGS

FIG. 6A illustrates example kernels that may be used to generate the response maps, in accordance with some embodiments.

FIG. 6B illustrates an example of additional filter kernels that may be used to refine the identified set of potential keypoints, in accordance with some embodiments.

Figure 1:
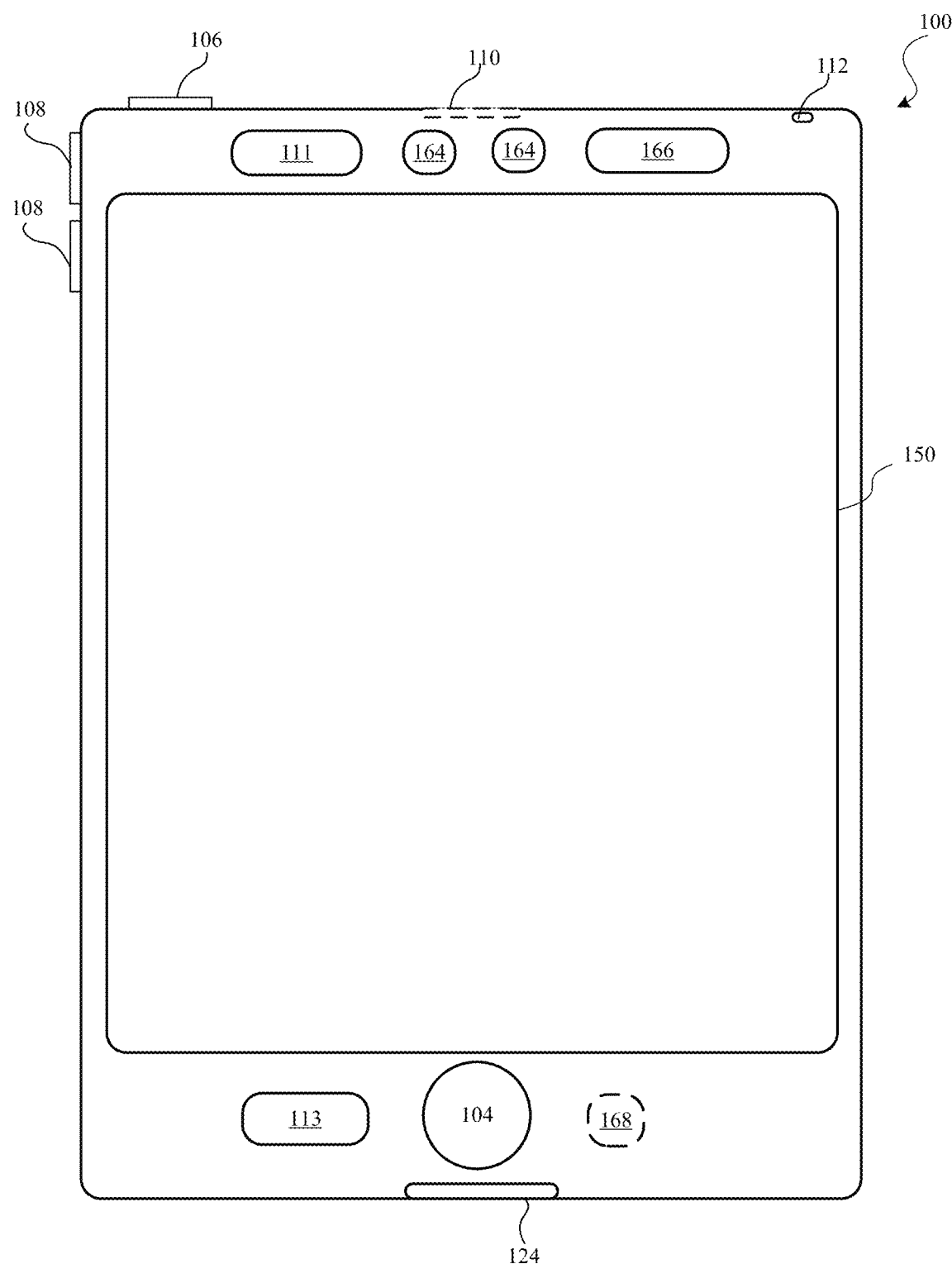
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processor having a keypoint detection circuit that identifies one or more points of interest (referred to also as keypoints) within received frames of image data. Received image data is used to construct an image pyramid (e.g., Gaussian pyramid), where each octave of the pyramid is constructed by blurring and subsampling the image data of the previous octave. For each octave of the Gaussian pyramid, the keypoint detection circuit comprises first and second branch circuit for processing the image data for the octave using two different blur levels in order to determine two different sets of keypoints. Furthermore, the image data may be processed by a third branch circuit that blurs the image data using a third blur level and decimating or subsampling to generate image data for a subsequent octave of the Gaussian pyramid. By using the keypoint detection circuit to generate multiple sets of keypoints for each octave of the Gaussian pyramid, a larger variety of keypoints with different types of descriptors can be obtained. These keypoints can be used for a variety of image processing purposes, such as identifying objects within an image frame, and matching objects across different images that may not be proximate in time or location. In some embodiments, computing multiple levels of keypoints corresponding to different blur levels for each octave may allow for keypoint localization in scale space to better match the keypoints with generated descriptors. For example, keypoints of multiple levels may be able to more closely matched with descriptors indicating the size or scale of the keypoints (e.g., based upon the level of the image pyramid from which the keypoints were identified), allowing for more accurate object identification and matching by matching keypoints that are closely matched in scale.

As used herein, a "Gaussian pyramid" may refer to a set of images based upon an input image and divided into a plurality of levels, each level being a blurred and/or subsampled version of the image of the previous level.

As used herein, an "octave" may refer to one or more levels of an image pyramid of a common resolution, where each octave is subsampled by a certain amount relative to the previous octave of the pyramid (e.g., power of 2 change in resolution).

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into components or have a different configuration or arrangement. The various components of device 100 listed above are embodied in hardware, software, firmware or a combination thereof, including one or more signal processing and/or application specific integrated circuits (ASICs).

Figure 2:
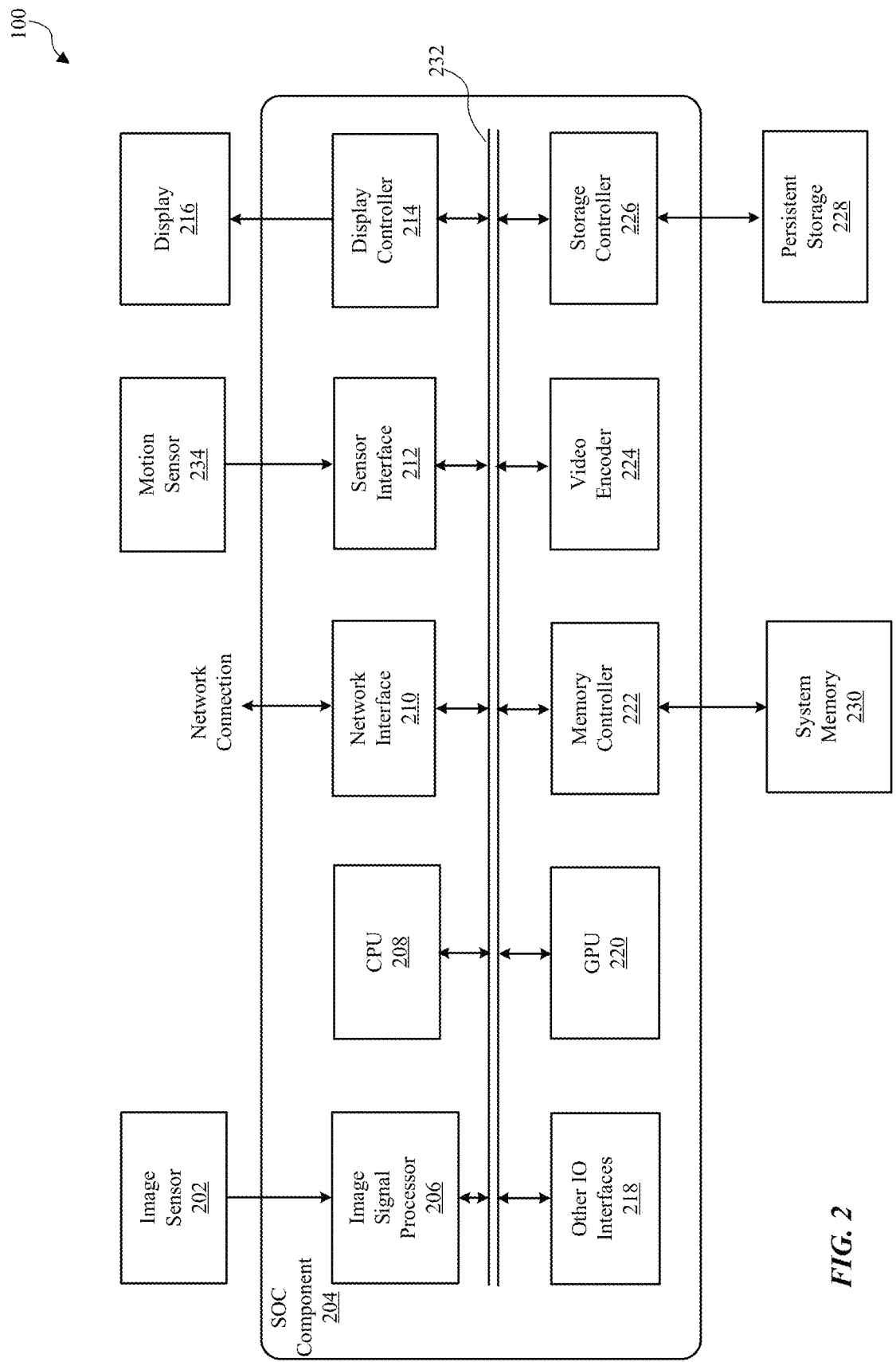
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAIVIBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
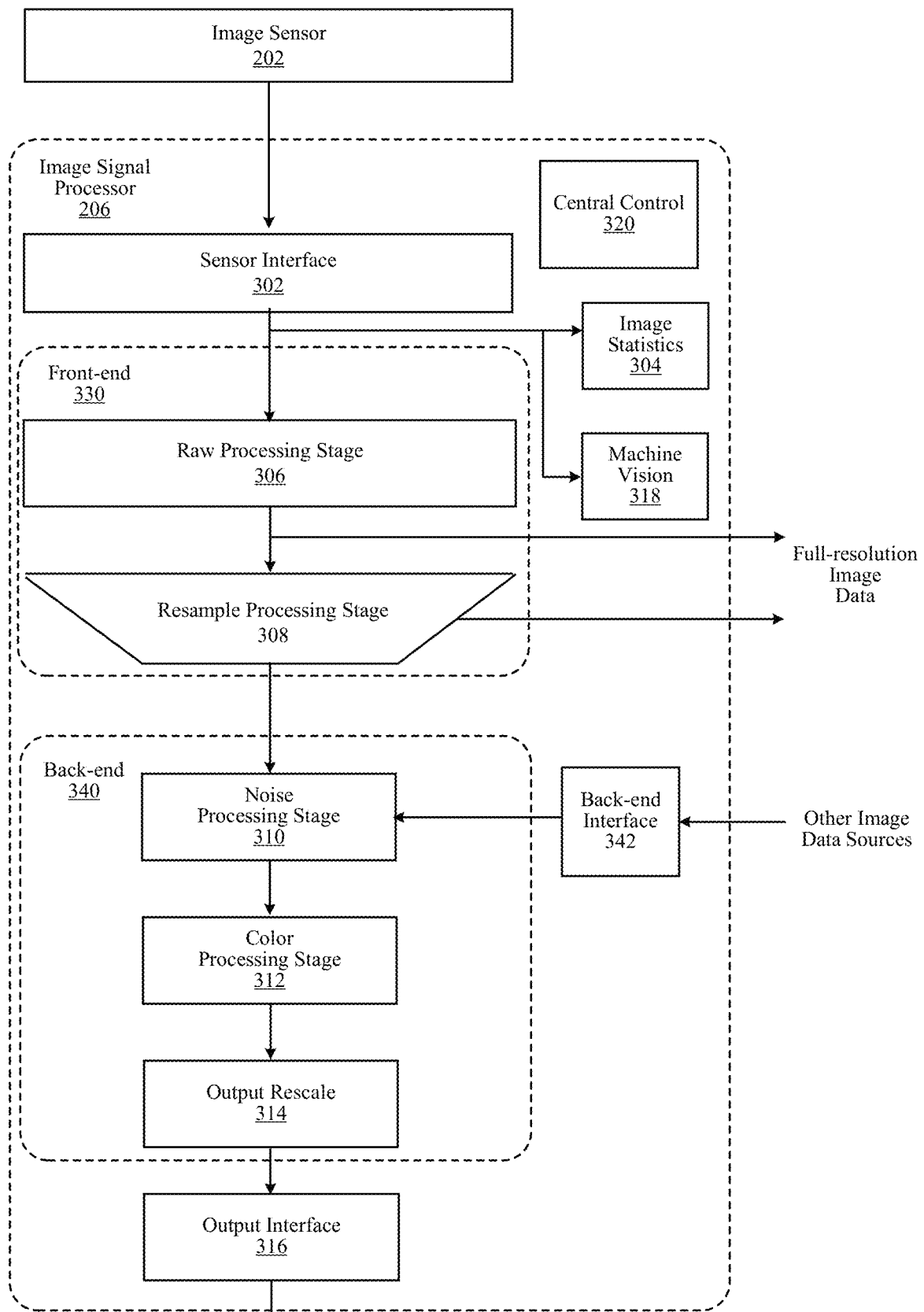
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, machine vision stage 318, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Machine vision stage 318 performs various operations to facilitate computer vision operations at CPU 208 such as facial detection in image data. The machine vision stage 318 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include scaling operation and computation of luminance if the input image data is not in YCrCb format. Global tone mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a path a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Figure 4:
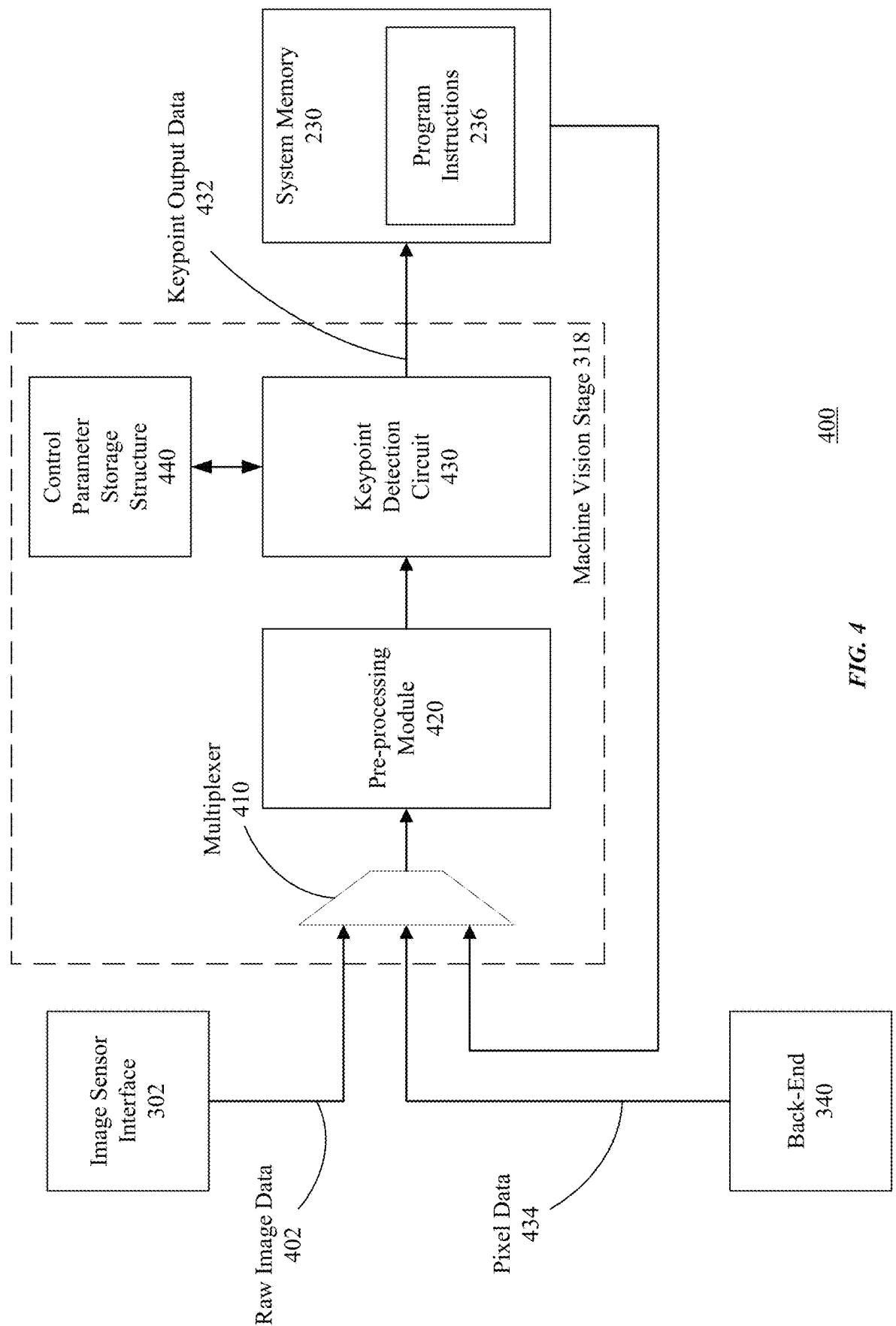
FIG. 4 is a logical block diagram illustrating a machine vision stage in an image signal processor, according to some embodiments.

As noted above, in various embodiments different stages may be configured to process image data at different rates, such as front-end pipeline stages 330 processing image data at an initial rate and back-end pipeline stages 340 processing image data at a reduced rate. Machine vision stage 318 may, in various embodiments, receive image data from raw processing stage at the initial data rate, process the image data, and provide output image data at the reduced image rate. FIG. 4 is a logical block diagram illustrating a machine vision stage 318 in an image signal processor 400, according to some embodiments.

In various embodiments, a front-end pixel data processing circuit, such as machine vision stage 318, may receive input data from multiple sources, including raw image data 402 from sensor interface(s) 302, processed image data (e.g., red green blue (RGB), or luminance blue-difference red-difference chroma (YCbCr)) from system memory 230, processed output data from the front-end module 330 (e.g., resample processing state 308), or processed output data from the color processing stage 312 or output rescale 314 of the back-end module 340 (e.g., Y data from an output circuit at the back-end of the pipeline, or full color output data). In an embodiment, multiplexer 410 accepts data from multiple input sources and dynamically selects the data into a single line coupled to pre-processing module 420, which may be configured to convert data from various pixel formats (e.g., raw pixel data, RGB formats, YCC formats, and single channel Y input data) into a luminance channel. In one embodiment, pre-processing module 420 may perform sub-sampling or other functions to reduce the size of input image data (e.g., by binning down the data). In one embodiment, pre-processing module 420 may also include one or more sub-modules for luminance computation. In some embodiments, pre-processing module 420 may subsample and/or bin the input data and then compute luminance values via a weighted average of the input channels. In an embodiment, pre-processing module 420 may use a lookup table (LUT) to facilitate global tone mapping and/or gamma correction of the luminance image data. Pre-processing module 420 and multiplexer 410 may thus enable machine vision stage 318 to receive image data from multiple sources and convert the image data down to one or more color channel(s), where the particular color channel may be selected or programmed dynamically.

In one embodiment, a pre-processing module (e.g., pre-processing module 420) converts the input image data into a luminance image or luminance channel. In an embodiment, computing a luminance image may include a weighted average of multiple luminance channels. In one embodiment, a weighted average of channels may be skipped if the input data is YCbCr data or a Y input image. In another embodiment, a sub-sampling may be performed to produce a further reduction in the size of the input image for the keypoint detection circuit. For example, if 2048 pixel wide data is input into a pre-processing module, then the pre-processing module and/or a sub-sampling module may reduce the data to a different width (e.g., 512 pixels) for efficient processing by a keypoint detection circuit.

In various embodiments, a back-end scaler module, such as output rescale 314, may provide one or more outputs of image data at the same or different rates. For instance, in some embodiments, back-end 340 may provide image data that is in the full-color domain and scaled at a reduced rate to other image signal processor pipeline stages for further processing. In some embodiments, the full-color scaled image single channel output data 434 may be additionally (or alternatively) written to system memory 230 to be stored for future processing or display. In an embodiment, the type of single channel color data accepted by machine vision stage 318 may be dynamically adjustable (i.e., programmable).

In one embodiment, modules in the front-end of machine vision stage 318, such as multiplexer 410 and pre-processing module 420, may process data at an initial rate, while modules towards the back-end of machine vision stage 318, such as keypoint detection circuit 430, may process image data at a reduced rate thereby conserving bandwidth in the image signal processor system. Multiplexer 410 and pre-processing module 420 may thus provide up-front data massaging that enables machine vision stage 318 to accept input data from multiple input sources (e.g., one or more image sensors, a memory, one or more back-end pipeline stages, or one or more front-end pipeline stages) for processing by keypoint detection circuit 430. In an embodiment, keypoint detection circuit 430 may thus be a sub-module of machine vision stage 318 that is capable of operating on raw data from image sensor interface(s) 302 (e.g., pixel data that has not yet been processed or otherwise written to memory), while also being able to selectively operate on processed data from memory and/or other sources in ISP 206.

In one embodiment, machine vision stage 318 and/or keypoint detection circuit 430 may include one or more spatial filter modules, sometimes referred to as "box filters", configured to compute an approximation of Gaussian derivatives of Hessian matrix values (in the interest of efficiency) for the respective pixels in an active region of an image. In an embodiment, keypoint detection circuit 430 may use multiple spatial filters (e.g., three 9×9 spatial filters) to obtain approximations to the elements of a Hessian matrix, where the filter output values may be Dxx, Dyy, and Dxy. In various embodiments, box filter output data may be stored in local memory of keypoint detection circuit 430 (or in system memory 230) and/or included in an adjustable response map used by keypoint detection circuit 430 to process input image frame data. Keypoint detection circuit 430 may then determine whether the responses are local maxima and whether a respective local maximum is above a controllable keypoint sensitivity threshold.

In an embodiment, keypoint detection circuit 430 may implement a keypoint detection operation to identify keypoints in image data. In one embodiment, keypoint detection circuit 430 may be hardware-based and able to output a number of keypoints per region of an input image (e.g., by outputting a number of keypoints in respective areas of a grid corresponding to regions of an image). In an embodiment, keypoint detection circuit 430 may selectively operate on one channel (e.g., a dynamically programmed single channel) of image data for luminance computation. For example, keypoint detection circuit 430 may operate on an R channel, a G channel, or a B channel for an input signal of RGB data. Similarly, keypoint detection circuit 430 may operate on a Y channel for an input signal of YCbCr data.

In one embodiment, keypoint detection circuit may receive one or more programmable control values from a keypoint control parameter storage structure 440. In an embodiment, keypoint control parameter storage structure 440 may include firmware and/or one or more registers configured for storing keypoint detection control values, such as multiple keypoint sensitivity threshold values, values corresponding to programmable block sizes of a grid corresponding to an input image, or the like. In some embodiments, CPU 208 may be configured to adjust one or more settings of control parameter storage structure 440 in response to output from keypoint detection circuit 430 and/or program instructions 236 stored in the system memory 230. Similarly, CPU 208 may be configured to control or otherwise adjust the settings of different modules of ISP 206 at various stages of the image processing pipeline (including, but not limited to machine vision stage 318) based on output from one or more of the ISP stages. In one embodiment, keypoint detection circuit 430 may be configured to receive one or more commands from program instructions 236 in the system memory 230 and/or control parameter storage structure 440. For example, keypoint detection circuit 430 may output/report a number of keypoints detected per grid region of an image, and program instructions may set and/or adjust a dynamically adjustable keypoint detection threshold value for one or more regions of the image based on the number of reported keypoints from the hardware module. In an embodiment, program instructions 236 and/or control parameter storage structure 440 may provide a programmable shift of a keypoint sensitivity threshold based on one or more response map value(s), such as a description of a keypoint and/or keypoint magnitude scores, of one or more regions of an image that is divided into a grid. The keypoint sensitivity threshold of machine vision stage 318 may thus be adjustable per region of an image based on one or more factors, such as the relative brightness, darkness, or feature shape type(s) of respective regions of the image. In various embodiments, output data from keypoint detection circuit 430 may be stored in system memory 230, stored in a different location within system memory 230, and/or reported directly to other stages of the pipeline of image signal processor 206.

In yet another embodiment, machine vision stage 318 may be configured (e.g., based on a setting of control parameter storage structure 440) to include an output mode having a programmable maximum limit (i.e., number) of allowable keypoints per region of an image (e.g., one keypoint per block), thereby improving the spatial uniformity of the keypoint output data 432 by preventing an excessive number of keypoints from being output for a region of the image. For example, in an embodiment of a single maximum keypoint per region of an image grid, machine vision stage 318, keypoint detection circuit 430, and/or program instructions 236 may be configured to output only a single keypoint having a highest strength score above an adjustable keypoint sensitivity threshold value (e.g., a highest response magnitude value that exceeds a current setting of an adjustable keypoint sensitivity threshold). If keypoint detection circuit 430 does not detect any keypoints in a region of the image and/or if a region of the image does not include any keypoints having strength scores that exceed a current setting of the adjustable keypoint sensitivity threshold, then keypoint detection circuit 430 may output zero keypoints corresponding to that particular region of the image.

In one embodiment, back-end module 340 may perform various scaling, resampling, or other image data operations on the converted image data in the full-color domain. In at least some embodiments, back-end module 340 may operate in multiple modes which provide different types of scaled, resampled, or otherwise modified image data output. For instance, back-end module 340 may provide a mode that corrects or suppresses artifacts in the image data (e.g., such as suppressing chroma aliasing artifacts to remove the aliasing artifacts near luminance edges that may have been introduced by a demosaic unit or removing dot artifacts introduced by the demosaic unit) without scaling the image data. Another mode for back-end module 340 may perform image downscaling and resampling (in addition to, or instead of, correcting or suppressing artifacts in the image data), in some embodiments.

Please note that FIG. 4 is provided as merely an example of a machine vision stage 318. Different combinations of the illustrated components (as well as components not illustrated) may be used to perform conversion from raw image data into a full-color domain or scale image data. Thus, the components of FIG. 4 and their respective layout or ordering is not intended to be limiting to the various other combinations which may be used by machine vision stage 318.

Keypoint Detection Using Gaussian Pyramid

As discussed above, keypoints may correspond to locations within an image that are surrounded by image patches well suited to matching in other images of the same scene or object. In some embodiments, keypoints are identified as locations within an image that include a local maximum magnitude (i.e., strength) value that exceeds an adjustable keypoint sensitivity threshold. In an embodiment, a keypoint detection circuit (e.g., the keypoint detection circuit 430 illustrated in FIG. 4) identifies one or more locations of interest within an image that facilitate the identification and/or matching of an object in a first image to subsequent images that include the same object. Locations within an image that may be suitable for use as keypoints may include locations corresponding to corners or junctions, as the autocorrelation magnitude value will tend to fall off steeply for small shifts in any direction relative to the keypoint location. On the other hand, locations along lines within the image may not be suitable for use as keypoints, as shifts along the direction of the line may not produce any change in magnitude value, and as such make the locations less suitable over matching in other images.

In one embodiment, a keypoint detection operation may include generating a response map of a received image by computing a response of the image to a spatial filter (e.g., a blur such as a Gaussian blur), and processing the blurred image using one or more response kernels. In some embodiments, the response map is generated by computing a response to spatial filters to obtain approximations of the elements of a Hessian matrix (e.g., Dxx, Dyy, and/or Dxy values), and computing an approximation to the determinant of the Hessian at one or more pixels as a response metric. The keypoint detection circuit further analyzes the response map by determining whether each respective local extrema magnitude is above an adjustable keypoint sensitivity threshold, determining whether the responses are indeed local extrema. The determined local extrema are designated keypoints, and the keypoint detection circuit communicates with a memory module (e.g., via a direct memory access (DMA) module) in order to store keypoint output data 432 in memory. In various embodiments, the keypoint output data 432 may include a description of a keypoint, the Cartesian (X,Y) coordinates of a keypoint, the response magnitude (i.e., strength) of each respective local maximum magnitude (i.e., strength) value that exceeds the adjustable keypoint sensitivity threshold, a sign bit value (i.e., polarity) of a keypoint, and/or which blur level the keypoint comes from if two levels per octave are computed simultaneously. In an embodiment, the sign bit (polarity) value may include data configured to enable keypoint detection circuit 430 to detect light-to-dark and/or dark-to-light transitions in pixel data of an input image frame. In one embodiment, machine vision stage 318 and/or keypoint detection circuit 430 may be programmable to be selectively configured to detect keypoint pixel locations, horizontal edge data, and/or vertical edge data. In some embodiments, each keypoint is associated with a descriptor based upon an image patch (also referred to as the "descriptor window") surrounding the keypoint location. For example, the descriptor may be based upon local gradients within the descriptor window (e.g., organized as a histogram, such as a histogram of oriented gradients (HOG)). In other embodiments, the descriptor is based upon comparison of different pixel location values or brightness levels within the descriptor window at particular blur levels.

For some applications, such as when processing image frames captured consecutively over time, performing a single level of keypoint detection as described above may be sufficient for tracking the relative positions of objects or other image features within the captured image frames. However, other applications, such as those involving scenes that are more separated in time or location (e.g., captured at different locations, over different periods of time, etc.), may require more detailed levels of keypoints in order to perform object identification and matching. For example, keypoints computed for different levels of an image pyramid can be used to determine if an object appearing in a first image in a first setting is also present in a second image in a second, different setting. In some embodiments, having different levels of keypoints spanning multiple octaves allows for tracking of an object between image frames to be first performed at a "coarse" level (e.g., using keypoints of octaves determined after several levels of downsampling). Because the image at those octaves will be smaller, each pixel of movement will correspond to several pixels in octaves at "finer" levels of the pyramid (e.g., octaves with less downsampling). The tracked motion at a coarse level may be used to guide and limit searching for the object at "finer" levels of the pyramid, until the highest resolution levels are reached. This may result in higher efficiency compared to simply attempting to identify the object in images at the highest (e.g., non-downsampled) resolution. In some embodiments, a Gaussian pyramid is used to generate different levels of keypoints for a captured frame of image data corresponding to different octaves of the Gaussian pyramid. For each octave of the Gaussian pyramid, two different sets of keypoints are determined based upon two different blur levels. By generating multiple sets of keypoints for each octave and over multiple octaves, a more detailed set of keypoints can be determined. This may be useful for certain applications such as being able to identify objects across different images that are not close together in time and location, or when a coarse to fine process is desired. In some embodiments, the keypoint detection circuit may select between determining only a single level of keypoints (e.g., as described above) or determining multiple levels of keypoints corresponding to different octaves of a Gaussian pyramid. For example, in some embodiments, the keypoint detection circuit may include a first circuit for computing a single level of keypoints from received image data, and a second circuit for constructing an image pyramid based upon received image data, from which multiple levels of keypoints per octave of the pyramid can be determined. Received image data may be processed using the first circuit or the second circuit, based upon a received configuration setting (e.g., corresponding to a current application, a user input, etc.), which may be stored in a register. In some embodiments, the first and second circuits may use different response kernels when determining keypoints. For example, the first circuit may process image data using a larger response kernel for generating response maps in comparison to the second circuit (e.g., the first circuit using Dxx, Dyy, and Dxy response kernels, while the second circuit uses only Dxx and Dyy kernels). In some embodiments, the first circuit generates response maps without performing any blurring on the image. In some embodiments, the first circuit may also be configured to generate a single level of keypoints over multiple octaves (e.g., 1 level of keypoints per octave based upon unblurred images). The first and second circuits may share common circuit components, such as memory, non-extrema suppression circuits, and/or the like.

Figure 5:
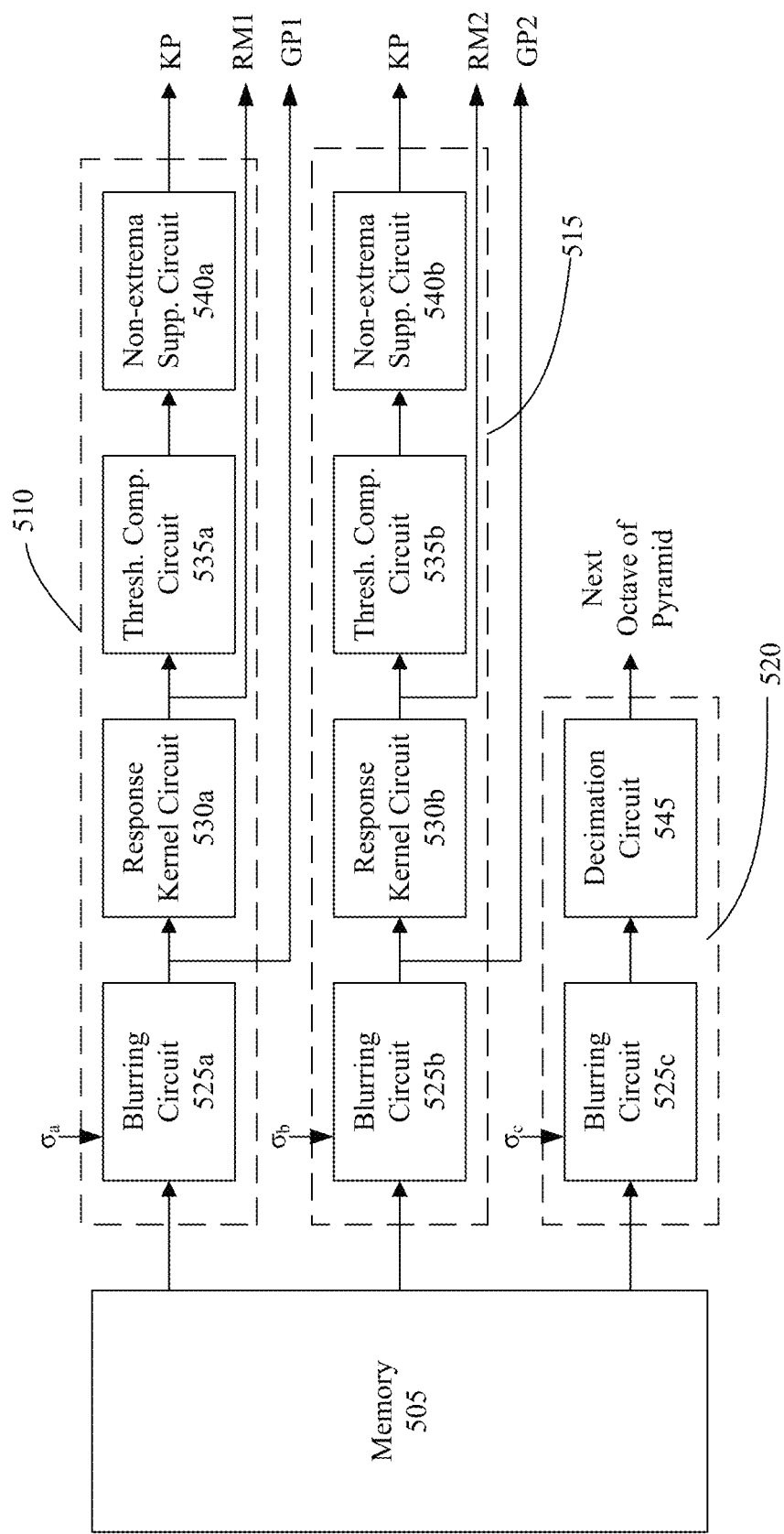
FIG. 5 illustrates a block diagram of a keypoint detection circuit, in accordance with some embodiments.

FIG. 5 illustrates a block diagram of a keypoint detection circuit that generates a Gaussian pyramid and detects multiple levels of keypoints per octave of the Gaussian pyramid, in accordance with some embodiments. The keypoint detection circuit 500 may be implemented as part of the keypoint detection circuit 430 illustrated in FIG. 4. The keypoint detection circuit 500 includes a memory 505 that receives a frame of image data. The memory 505 may correspond to a cache or buffer. In some embodiments, the data of the image frame may have undergone preprocessing (e.g., by the preprocessing module 420 illustrated in FIG. 4), in order to conform to a particular data format (e.g., from 16-bit data to 8-bit data). In some embodiments, the memory 505 is sized to be able to store a number of rows of image data sufficient for processing the image data using a particular blur kernel. For example, in embodiments where image data is processed using a 9×9 blur kernel, the memory 505 may be sized to be able to store 8 rows of image data, each row comprising up to 1280 pixels of 8-bit image data, or 640 pixels of 16-bit image data (e.g., data for one row being currently processed by the keypoint detection circuit 500, and the remaining 8 rows stored in the memory 505).

The keypoint detection circuit 500 comprises a plurality of sub-circuits, or "branches." The branches of the keypoint detection circuit 500 may include a plurality of keypoint generation circuits, each comprising one or more circuits for determining a level of keypoints based upon a different blur kernel. In addition, the branches may further include a filter and decimation circuit that generates an image frame for a subsequent octave of the Gaussian pyramid. For example, the keypoint detection circuit 500 comprises a first branch 510 and a second branch 515 corresponding to keypoint generation circuits that each generate a different level of keypoint, and a third branch 520 corresponding to a filter and decimation circuit that generates a blurred and decimated image frame for a subsequent octave of the Gaussian pyramid. In some embodiments, the keypoint detection circuit 500 may receive a control signal specifying a number of branches to be used for generating keypoints. For example, the control signal may specify only a single keypoint generation branch is to be used to identify keypoints in the image data.

For each branch, the received image stored in the memory 505 is processed by a respective blurring circuit 525 (e.g., blurring circuits 525a, 525b, and 525c) using spatial filters that blur the image using up to three different blur kernels (e.g., 9×9 blur kernels), one for each of the branches 510, 515, and 520. In some embodiments, the amount of blur is indicated by a standard deviation value (e.g., a sigma value σ), where the sigma value associated with each branch of the keypoint detection circuit 500 is selected from a plurality of possible sigma values. For example, the control parameter storage structure 440 may store the following possible blur levels, of which up to three are selected to correspond to each of the branches of the keypoint detection circuit 500:

$$\sigma(1)=[2,28,124,204,124,28,2]$$

$$\sigma(\sqrt{2})=[3,15,53,113,144,113,53,15,3]$$

$$\sigma(\sqrt{3})=[8,27,61,101,118,101,61,27,8]$$

$$\sigma(2)=[14,34,63,92,106,92,63,34,14]$$

$$\sigma(0)=[512] \quad (1)$$

Each of the blur levels indicated in the equations (1) blurs the pixels of the image frame by performing convolution on the values of one or more nearby pixels. For example, the value of a pixel may be determined based upon a weighted sum of the values of the nearby pixels as specified for each sigma value in equation (1), divided by a total value (e.g., 512). In some embodiments, the nearby pixel values used to blur the image may correspond to nearby pixels in a horizontal direction, vertical direction, or some combination thereof. For example, in some embodiments, the blurring circuit filters the image based upon the chosen blur level in the vertical direction, and separately in the horizontal direction. By filtering in each direction separately, a total number of multiplications needed to be performed may be reduced in comparison to filtering using a two-dimensional kernel (e.g., 18 multiplications for a 9×9 kernel instead of 81).

Each blurring circuit 525 receives a control signal specifying which sigma value stored in the control parameter storage structure 440 is to be used for blurring the received image frame data for the branch. A control circuit may select a stored sigma value from the control parameter storage structure 440 and store the selected sigma values in one or more registers corresponding to each branch of the keypoint detection circuit 500. As such, the blurring circuits 525 for each of the branches 510, 515, and 520 may receive a different respective blur level ($\sigma_a$, $\sigma_b$, and $\sigma_c$). The first blur level $\sigma_a$ and second blur level $\sigma_b$ each correspond to the first and second branches 510 and 515 used to determine different sets of keypoints, while the third blur level $\sigma_c$ corresponds to the third branch 520 used to generate an image for a subsequent level (i.e., octave) of the Gaussian pyramid.

Figures 6A, 6B:
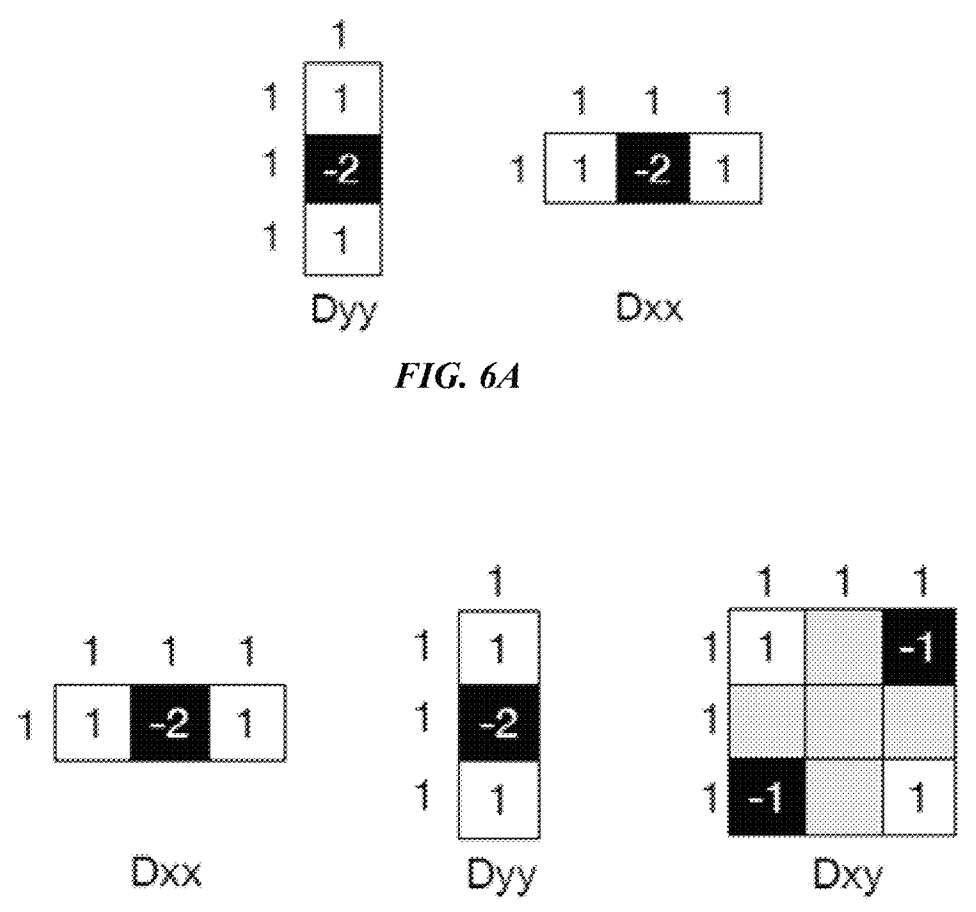

In each of the keypoint generation circuits (e.g., first and second branches 510 and 515), a response kernel circuit 530 processes the blurred image frame data (blurred by the respective blurring circuits 525a and 525b based upon $\sigma_a$ and $\sigma_b$) using a response kernel, in order to generate a response map. In some embodiments, the response kernel comprises a 3×3 response kernel. FIG. 6A illustrates example kernels that may be used by the response kernel circuit to generate the response maps, in accordance with some embodiments. The response kernels may be Laplacian kernels, and include a first Dyy kernel corresponding to a vertical direction, and a second Dxx kernel corresponding to a horizontal direction. In some embodiments, values of the response map may be calculated based upon the first and second kernels as follows:

$$Res=Dxx+Dyy \quad (2)$$

where Dxx and Dyy correspond to the response values of a particular pixel may processed using the first and second kernels. In some embodiments, the values of the response map may be normalized using one or more programmable normalization factors.

After the response map for a branch has been determined, the threshold comparison circuit 535 compares the values (e.g., magnitude or absolute value) of the response map to one or more keypoint sensitivity threshold values, and outputs the results of the comparison to the non-extrema suppression circuit 540. For example, the threshold comparison circuit 535 may filter out portions of the response map that do not meet the keypoint sensitivity threshold. The keypoint sensitivity threshold used by the threshold comparison circuit 535 may be configured by a control signal. In some embodiments, the keypoint sensitivity threshold may be set to a lower value to increase a number of keypoints identified, or to a higher level such that only stronger keypoints are identified. In some embodiments, the keypoint sensitivity threshold may be configured using a control loop such that approximately a predetermined number of keypoints will be identified from the image data.

The non-extrema suppression circuit 540 performs non-extrema (e.g., non-maximum, or non-minimum) suppression on the received values to identify a set of local extrema, which are output as keypoints. As such, each keypoint corresponds to a local maximum or local minimum value of the response map that exceeds the predetermined keypoint sensitivity threshold.

In some embodiments, the identified keypoints are only potential keypoints, and the keypoint detection circuit 500 may further process each potential keypoint following non-extrema suppression using one or more additional filter kernels, in order to further refine the set of potential keypoints. In some embodiments, the additional filter kernels are used to process the entire response map in hardware, but only the outputs corresponding to locations near the locations of the potential keypoints (as determined by the non-extrema suppression circuit 540) are considered.

FIG. 6B illustrates an example of additional filter kernels applied to the response map that may be used to refine the identified set of potential keypoints, in accordance with some embodiments. The illustrated filter kernels are computed centered around the location of each potential keypoint (as determined based upon the output of the non-extrema suppression circuit). The outputs of the filter are used to determine a determinant (Det) and a squared trace (Tr2) as follows:

$$Det = Dxx*Dyy - \text{roundUp}(Dxy*Dxy, 4) \quad (3)$$

$$Tr2 = (Dxx + Dyy)^2$$

where roundUp is a function that rounds up an input value (e.g., Dxy*Dxy) to a specified number of decimal places (e.g., 4). The determined Det and Tr2 values for the potential keypoint are then subject to the following test:

$$Tr2 > \text{KeyFlow1Thresh} * \text{abs}(Det) \quad (4)$$

where KeyFlow1Thresh corresponds to a predetermined threshold value. The KeyFlow1Thresh threshold value may be different from the threshold value used for non-extrema suppression, and may be configured by a user and stored in a register. If Equation (4) is satisfied for the particular potential keypoint, then the keypoint detection circuit 500 identifies the potential keypoint as a valid keypoint.

Each of the keypoint generation circuits (e.g., the first and second branches 510, 515) thus outputs a respective blurred image corresponding to an image of the Gaussian pyramid (GP), a response map (RM) corresponding to the response of the blurred image to a combination of response kernels (e.g., as illustrated in FIG. 6A), and a set of keypoints (KP) determined based upon the response map. The data for each keypoint may indicate the coordinates of the keypoint within the image frame (e.g., Cartesian coordinates), the response magnitude (i.e., strength) of the corresponding local maximum exceeding the keypoint sensitive threshold, a sign bit value (i.e., polarity) of the keypoint, a description of the keypoint (e.g., a type of keypoint, one or more image edge scores associated with the keypoint), and/or the like.

In some embodiments, the blurred images (e.g., Gaussian pyramid images GP1, GP2) are stored in a memory and used to construct an image pyramid. In addition, the blurred images may be analyzed to generate descriptors for identified keypoints. In some embodiments, the determined response maps (RM1, RM2) may be stored as used for a variety of applications, such as cross-scale non-extrema suppression, sub-pixel localization, or other types of applications. For example, the determined response maps may be used to perform scale space localization to determine a size of each identified keypoint within a captured image (e.g., based upon the level of the image pyramid from which the keypoint was identified). By determining the sizes of the keypoints, object matching between frames taken over different time periods and possibly having different magnification levels may be facilitated. For example, images of the same object at different zoom levels can be compared by matching keypoints associated with different octaves that are similar in size.

The third branch 520 of the keypoint detection circuit 500 is a filter and decimation circuit, includes a decimation circuit 545 that receives the blurred image frame data from the blurring circuit 525c (blurred based upon $\sigma_c$) and reduces the resolution of the image data via subsampling. For example, the decimation circuit 545 may subsample the image data by a factor of 2 across each dimension (e.g., height and width). The resulting blurred and decimated image may be used for determining keypoints for a next octave of the Gaussian pyramid.

In some embodiments, the output of the decimation circuit 545 is stored in a memory (e.g., a DRAM or a cache) before being transmitted back to the memory 505 of the keypoint detection circuit 500, to be used by the keypoint detection circuit 500 in determining additional keypoints. In other embodiments, the generated image is transmitted to a second keypoint detection circuit 500 for processing subsequent octaves.

Although FIG. 5 illustrates the first and second branches 510 and 515 as generating different levels of keypoints by applying different levels of blur to images having the same resolution, in some embodiments, the first and second branches 510 and 515 may comprise decimation circuits to allow for generating keypoints based on different resolutions within an octave. For example, the second branch 515 may decimate a received by $1/\sqrt{2}$ in each direction relative to the first branch 510, and apply a blur kernel to the decimated image produce an equivalent level of blur, from which keypoints may be generated.

Figures 7A, 7B:
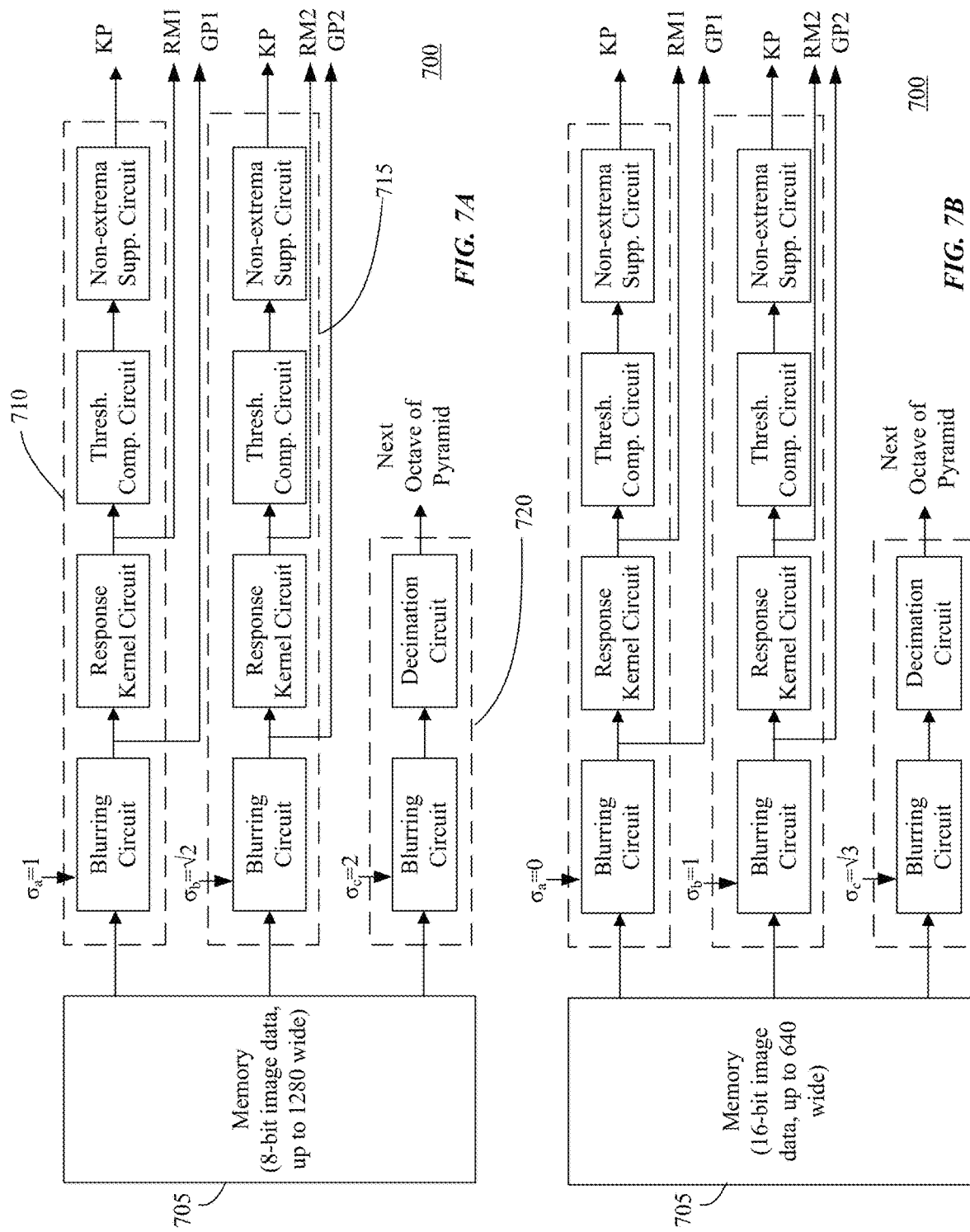
FIGS. 7A and 7B illustrate a keypoint detection circuit used to process and extract keypoints from multiple octaves of a Gaussian pyramid, in accordance with some embodiments.

FIGS. 7A and 7B illustrate a keypoint detection circuit used to process and extract keypoints from multiple octaves of a Gaussian pyramid, in accordance with some embodiments. The keypoint detection circuit 700 may correspond to the keypoint detection circuit 500 illustrated in FIG. 5. The keypoint detection circuit 700 receives a set of control parameters (e.g., from the control parameter storage structure 440) specifying blur levels (i.e., sigma values) to be used by the blurring circuits for each branch, keypoint sensitivity threshold values, and/or the like, for which to configure the various sub-circuits of the keypoint detection circuit 700. In some embodiments, the keypoint detection circuit 700 receives a first set of control parameters for processing a first octave of the Gaussian pyramid, and a second set of control parameters for processing one or more subsequent octaves of the Gaussian pyramid.

FIG. 7A illustrates the keypoint detection circuit 700 processing a first octave of a Gaussian pyramid, in accordance with some embodiments. The keypoint detection circuit 700 receives first image data corresponding to an image frame. The first image data may have been received from an image sensor interface or from a pre-processing circuit (e.g., the pre-processing module 420 illustrated in FIG. 4). In some embodiments, the image data may comprise 8-bit image data with a maximum width per row of 1280. In some embodiments, the row width and bit depth of the image data that can be received is based upon a capacity of the memory 705.

The blurring circuits of each of the branches 710, 715, and 720 of the keypoint detection circuit 700 blur the first image data by a different amount, as specified by respective sigma values of the set of provided control parameters. In some embodiments, the amount of blur (as indicated by the sigma values $\sigma_a$, $\sigma_b$, and $\sigma_c$) increases from the first branch 710 to the third branch 720. For example, as illustrated in FIG. 7A, the first image data using a sigma value of $\sigma_a=1$ for the first branch 710, using a sigma value of $\sigma_b=\sqrt{2}$ for the second branch 715, and using sigma value of $\sigma_c=2$ for the third branch 720.

Each of the first and second branches 710 and 715 of the keypoint detection circuit 700 uses its respective response kernel circuit to filter its respective blurred image (GP1 and GP2) using a response kernel (e.g., the 3×3 response kernel illustrated in FIG. 6A) to produce respective first and second response maps (RM1 and RM2). The response maps may then be subject to threshold comparison by the threshold comparison circuit and non-extrema suppression circuit to generate first and second sets of keypoints (KP). On the other hand, the third branch 720 decimates its blurred image using a decimation circuit to produce image data for a subsequent octave of the Gaussian pyramid (e.g., a second octave). In some embodiments, the decimation circuit outputs decimated image data at a particular bit depth that is greater than the bit depth of the first image data. For example, while the first image data may have a bit depth of 8 bits, the decimation circuit may output 16-bit image data. However, because decimation reduces the number of pixels of image data, the amount of storage needed to store the decimated image data output by the decimation circuit may not increase, despite the increase in image data bit depth. As such, the first image data used by the keypoint detection circuit 700 for processing the first octave may comprise 8-bit image data, while the image data for all subsequent octaves may be 16-bit image data.

FIG. 7B illustrates the keypoint detection circuit 700 processing one or more subsequent octaves of the Gaussian pyramid, in accordance with some embodiments. The keypoint detection circuit 700 receives and stores second image data in the memory 705. The second image data corresponds to the blurred and decimated image produced by the third branch 720 when processing a previous octave, and may comprise 16-bit image data.

As illustrated in FIG. 7B, the levels of blur (sigma values) used for processing the second image data over subsequent octaves may be different from the levels of blur used to process the first octave. In some embodiments, the sigma values are selected such that the aggregate blur levels for each branch of the keypoint detection circuit 700 remain constant over a plurality of octaves. Because the first octave receives non-blurred image data while the image data used for processing the second and subsequent octaves has already been blurred, the sigma values for processing the first octave and subsequent octaves will be different.

For example, in the first octave, blurring the initial image using a sigma of 2 followed by a decimation results an effective blur level of sigma 1. As such, to achieve the same blur levels in the second and subsequent octaves, the image data is not further blurred in the first branch 510 (i.e., $\sigma_a=0$), resulting in a total effective $\sigma=1$ for the first branch. Similarly, blurring the $\sigma=1$ image data by an additional $\sigma_b=1$ in the second branch 515 results in an aggregate blurring of $\sigma=\sqrt{2}$, while the additional $\sigma_c=\sqrt{3}$ blur in the third branch 520 results in an aggregate $\sigma=2$ blur in the third branch, to be further decimated for use in a subsequent octave.

Similar to the processing of the first octave, the keypoint detection circuit 700 processes the second octave and subsequent octaves to determine two different sets of keypoints corresponding to two different blur levels, and produces a blurred, decimated image for use in a subsequent octave. In some embodiments, the total number of octaves may be specified by a received control parameter. In other embodiments, the keypoint detection circuit 700 may continue to process image data corresponding to successive octaves until the image data for an octave has less than a threshold number of pixels.

While the above discussion primarily refers to the keypoint detection circuit 700 as processing an image frame, in some embodiments, the received image data may correspond to only part of an image frame. For example, in some embodiments, an image frame may be divided into a number of different regions, where the keypoint detection circuit 700 processes only one region at a time. In some embodiments, different regions may be processed with different control parameters (e.g., different keypoint sensitivity thresholds).

Process Flow

Figure 8:
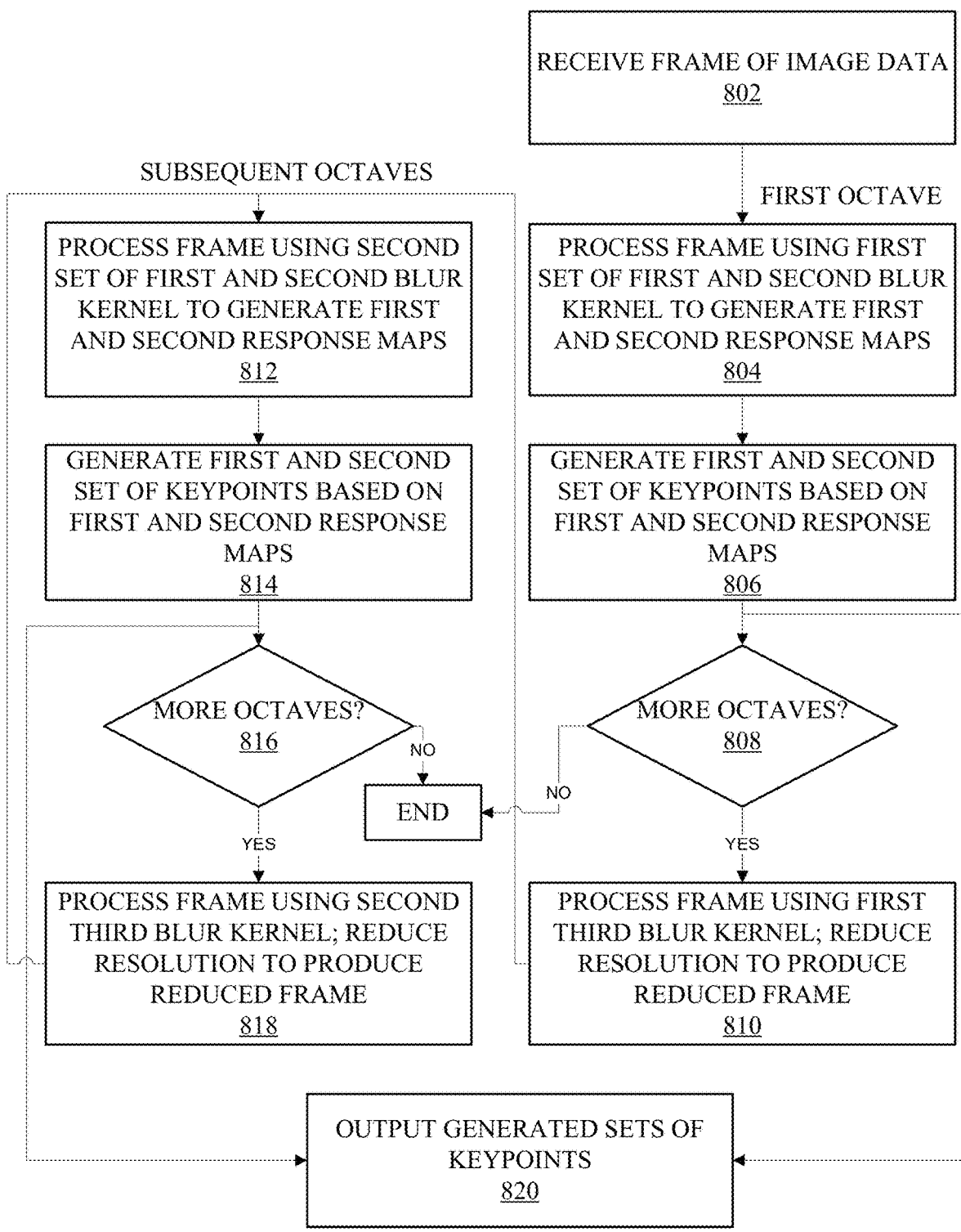
FIG. 8 illustrates a flowchart of a process for determining keypoints in an image frame, in accordance with some embodiments.

FIG. 8 illustrates a flowchart of a process for determining keypoints in an image frame, in accordance with some embodiments. The keypoint detection circuit receives 802 image data from which keypoints are to be determined. The image data may correspond to an image frame, which may be captured by an image sensor and/or output from a preprocessor. For example, the image data may comprise 8-bit image data up to 1280 pixels wide.

The keypoint detection circuit processes 804 the image data using at least a first set of first and second blur kernels to blur the image, and filters the blurred images using a combined set of response kernels to generate respective first and second response maps. In some embodiments, the blur kernel may comprise a 9×9 blur kernel. The amount of blur may be selected from a plurality of predetermined sigma values stored in hardware, and selected in registers corresponding to each branch of the keypoint detection circuit. In some embodiments, the response kernels comprise Laplacian filters.

The keypoint detection circuit generates 806, based upon the first and second response maps, respective first and second sets of keypoints by comparing the values of the response maps to one or more keypoint sensitivity thresholds and performing non-extrema suppression on the resulting values. In some embodiments, the first and second sets of keypoints may be further filtered based upon one or more additional kernels to verify that the keypoints correspond to a local maximum or minimum. The keypoint detection circuit outputs 820 the generated sets of keypoints. For example, the keypoints may be stored in a memory for use in subsequent processing (e.g., object identification, matching of objects between different image frames, and/or the like).

The keypoint detection circuit may determine 808 whether additional octaves are to be processed. In some embodiments, the keypoint detection circuit processes a predetermined number of octaves. In other embodiments, the keypoint detection circuit continues to process octaves until the decimated image data for a subsequent octave does not include at least a threshold number of pixels. If no more octaves are to be processed, the process ends.

On the other hand, if additional octaves are to be processed, then the keypoint detection circuit processes 810 the image data using a third blur kernel, and reduces a resolution of the image data to produce image data for the next octave. In some embodiments, the third blur kernel is greater than the first and second blur kernels used to generate the first and second sets of keypoints. In some embodiments, reducing the resolution of the blurred image data comprises decimating the image data by a factor of 2 by height and width.

In a subsequent octave, the keypoint detection circuit processes 812 the blurred, decimated image data using a second set of first and second blur kernels to further blur the image data, and filter the blurred image data based upon a combination of a set of response kernels to generate respective first and second response maps for the octave. In some embodiments, the second set of first and second blur kernels may be selected to, in combination with the third blur kernel and decimation, result in an equivalent amount of blurring as the application of the first set of first and second blur kernels on the initially received (unblurred) image data.

The keypoint detection circuit generates 814 first and second sets of keypoints for the octave based upon the first and second response maps. The first and second sets of keypoints may be generated using the same threshold comparison circuit and non-extrema suppression circuit as that used to generate the first and second sets of keypoints for the previous octave. The keypoint detection circuit may then output 820 the generated sets of keypoints to be stored in a memory. In addition, the blurred images (e.g., using the first and second blur kernels) and response maps may also be stored for later use.

The keypoint detection circuit determines 816 whether there are additional octaves to be processed. If so, the keypoint detection circuit processes 818 the image data using a second third blur kernel, and reduces a resolution of the image data to generate image data for a subsequent octave. Otherwise, the process ends.

As such, the keypoint detection circuit is able to receive image data and identify multiple levels of keypoints within the received image data. The multiple levels of keypoints may be used to identify objects in the image and match identified objects with other image frames captured in different locations or at different times. To determine the multiple levels of keypoints, the keypoint detection circuit constructs a Gaussian pyramid having a plurality of octaves, using the received image data. Image data for each octave is blurred to at least one, often more, levels to determine different set of keypoints per octave, in order to generate a larger variety of keypoints suitable for object identification and matching.

In some embodiments, although the keypoint detection circuit discussed above has at least two different keypoint generation circuits (branches), the keypoint detection circuit can in some cases be operated to only generate keypoints from one of its keypoint generation circuits. As such, the keypoint detection circuit may only generate a single level of keypoints per octave corresponding to a single blur level. In other embodiments, the keypoint detection circuit comprises more than two keypoint generation circuits.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A keypoint detection circuit, comprising:
a first keypoint generation circuit configured to, for a first octave of an image pyramid:
receive a first parameter indicating a first blur level;
receive image data from a memory;
generate a first set of keypoints from a first response map generated by blurring the image data to the first blur level in the first octave of an image pyramid;
a second keypoint generation circuit configured to, for the first octave of the image pyramid:
receive a second parameter indicating a second blur level;
receive the image data from the memory;
generate a second set of keypoints from a second response map generated by blurring the image data to the second blur level in the first octave; and
a filter and decimation circuit configured to, for the first octave of the image pyramid, generate a second octave of the image pyramid by generating a downscaled version of the image data from the image data, and transmit the downscaled version of the image data to the memory;
wherein the first keypoint generation circuit is further configured to, for at least a second octave of the image pyramid:
receive a third parameter indicating a third blur level;
receive the downscaled version of the image data from the memory;
generate a third set of keypoints from a third response map generated by blurring the downscaled version of the image data to a third blur level in the second octave of the image pyramid; and
wherein the second keypoint generation circuit is further configured to, for at least the second octave of the image pyramid:
receive a fourth parameter indicating a fourth blur level;
receive the downscaled image data from the memory; and
generate a fourth set of keypoints from a fourth response map generated by blurring the downscaled version of the image data to a fourth blur level in the second octave.

2. The keypoint detection circuit of claim 1, wherein the filter and decimation circuit is configured to:
blur the image data using a fifth blur level greater than the first and second blur levels; and
reduce a resolution of the processed image data to generate the downscaled version of the image data.

3. The keypoint detection circuit of claim 1, wherein the filter and decimation circuit is configured to generate the downscaled version of the image data in response to a received indication for the keypoint detection circuit to process at least the second octave.

4. The keypoint detection circuit of claim 1, wherein the first and second keypoint generation circuits are further configured to use the third and fourth blur levels to generate response maps for one or more octaves subsequent to the second octave.

5. The keypoint detection circuit of claim 1, wherein the first keypoint generation circuit comprises:
a blurring circuit configured to blur the image data at the first blur level in the first octave;
a response kernel circuit configured to process the blurred image data, in the first octave, using at least one response kernel to generate the first response map;
a threshold comparison circuit configured to filter out portions of the first response map that do not meet a keypoint sensitivity threshold; and
a non-extrema suppression circuit configured to receive the filtered first response map from the threshold comparison circuit, and to determine one or more local extrema of the filtered first response map to be designated as the first set of keypoints.

6. The keypoint detection circuit of claim 1, wherein the third blur level is selected to be different from the first blur level and such that the application of the third blur level on the downscaled version of the image data results in an aggregate level of blur applied on the downscaled version of the image data that is equivalent to the first blur level applied on the image data, and the fourth blur level is selected to be different from the second blur level and such that application of the fourth blur on the downscaled version of the image data results in an aggregate level of blur applied on the downscaled version of the image data that is equivalent to the second blur level applied on the image data.

7. The keypoint detection circuit of claim 1, wherein the first, second, third, and fourth blur levels are selected from a plurality of preconfigured blur levels stored in a control parameter storage structure.

8. The keypoint detection circuit of claim 1, wherein the image data has a bit depth of 8 bits, and the filter and decimation circuit is configured to generate downscaled version of the image data has a bit depth of 16 bits.

9. The keypoint detection circuit of claim 5, wherein the first keypoint generation circuit further processes the image data associated with the one or more local extrema using one or more additional filter kernels, to further filter the or more local extrema to be designated as part of the first set of keypoints.

10. A method, comprising:
at a first keypoint generation circuit, for a first octave of an image pyramid:
receiving a first parameter indicating a first blur level;
receiving image data from a memory;
generating a first set of keypoints from a first response map generated by blurring the image data to the first blur level in the first octave of an image pyramid;
at a second keypoint generation circuit, for the first octave of the image pyramid:
receiving a second parameter indicating a second blur level;
receiving the image data from the memory;
generating a second set of keypoints from a second response map generated by blurring the image data to the second blur level in the first octave;
at a filter and decimation circuit, for the first octave of the image pyramid, generating a second octave of the image pyramid by generating a downscaled version of the image data from the image data, and transmitting the downscaled version of the image data to the memory;
at the first keypoint generation circuit, for at least a second octave of the image pyramid:
receiving a third parameter indicating a third blur level;
receiving the downscaled version of the image data from the memory;
generating a third set of keypoints from a third response map generated by blurring the downscaled version of the image data to a third blur level in the second octave of the image pyramid; and
at the second keypoint generation circuit, for at least the second octave of the image pyramid:
receiving a fourth parameter indicating a fourth blur level;
receiving the downscaled image data from the memory; and
generating a fourth set of keypoints from a fourth response map generated by blurring the downscaled version of the image data to a fourth blur level in the second octave.

11. The method of claim 10, further comprising, at the filter and decimation circuit:
blurring the image data using a fifth blur level greater than the first and second blur levels; and
reducing a resolution of the processed image data to generate the downscaled version of the image data.

12. The method of claim 10, wherein generating the downscaled version of the image data is performed in response to a received indication for the keypoint detection circuit to process at least the second octave.

13. The method of claim 10, further comprising, at the first and second keypoint generation circuits, using the third and fourth blur levels to generate response maps for one or more octaves subsequent to the second octave.

14. The method of claim 10, further comprising, using the first keypoint generation circuit:
blurring the image data at the first blur level in the first octave;
processing the blurred image data using a response kernel to generate the first response map;
filtering out portions of the first response map that do not meet a keypoint sensitivity threshold; and
determining one or more local maximums of the filtered first response map to be designated as the first set of keypoints.

15. The method of claim 10, wherein the third blur level is selected to be different from the first blur level and such that the application of the third blur level on the downscaled version of the image data results in an aggregate level of blur applied on the downscaled version of the image data that is equivalent to the first blur level applied on the image data, and the fourth blur level is selected to be different from the second blur level and such that application of the fourth blur on the downscaled version of the image data results in an aggregate level of blur applied on the downscaled version of the image data that is equivalent to the second blur level applied on the image data.

16. The method of claim 10, wherein the first, second, third, and fourth blur levels are selected from a plurality of preconfigured blur levels stored in a control parameter storage structure.

17. The method of claim 10, wherein the image data has a bit depth of 8 bits, and the filter and decimation circuit is configured to generate downscaled version of the image data has a bit depth of 16 bits.

18. The method of claim 14, further comprising, using the first keypoint generation circuit, processing the image data associated with the one or more local maximums using one or more additional filter kernels, to filter out at least one of the one or more local maximums to be designated as part of the first set of keypoints.

19. A system, comprising:
a storage component configured to receive and store image data corresponding to an image frame;
a keypoint detection circuit configured to receive image data from the storage component and determine keypoints for the image frame based upon the received image data, comprising:
a first keypoint generation circuit configured to:
receive a first parameter indicating a first blur level;
receive image data from the storage component;
generate a first set of keypoints from a first response map generated by blurring the image data to the first blur level in the first octave of an image pyramid, and
a second keypoint generation circuit configured to:
receive a second parameter indicating a second blur level;
receive the image data from the storage component;
generate a second set of keypoints from a second response map generated by blurring the image data to the second blur level in the first octave, and
a filter and decimation circuit configured to, for the first octave of the image pyramid, generate a second octave of the image pyramid by generating a downscaled version of the image data from the image data, and transmit the downscaled version of the image data to the storage component; and
wherein the first keypoint generation circuit is further configured to, for at least a second octave of the image pyramid:
receive a third parameter indicating a third blur level;
receive the downscaled version of the image data from the storage component;

generate a third set of keypoints from a third response map generated by blurring the downscaled version of the image data to a third blur level in the second octave of the image pyramid; and wherein the second keypoint generation circuit is further configured to, for at least the second octave of the image pyramid:

receive a fourth parameter indicating a fourth blur level;

receive the downscaled image data from the storage component; and generate a fourth set of keypoints from a fourth response map generated by blurring the downscaled version of the image data to a fourth blur level in the second octave; and a memory configured to store the first, second, third, and fourth sets of keypoints.

20. The system of claim 19, wherein the first keypoint generation circuit comprises:

a blurring circuit configured to blur the image data at the first blur level in the first octave;

a response kernel circuit configured to process the blurred image data, in the first octave, using response kernels to generate the first response map;

a threshold comparison circuit configured to filter out portions of the first response map that do not meet a keypoint sensitivity threshold; and a non-extrema suppression circuit configured to receive the filtered first response map from the threshold comparison circuit, and to determine one or more local extrema of the filtered first response map to be designated as the first set of keypoints.

* * * * *

UNITED STATES PATENT AND TRADEMARK OFFICE
CERTIFICATE OF CORRECTION

PATENT NO. : 10,769,474 B2  
APPLICATION NO. : 16/101138  
DATED : September 8, 2020  
INVENTOR(S) : David R. Pope et al.

Page 1 of 1

It is certified that error appears in the above-identified patent and that said Letters Patent is hereby corrected as shown below:

In the Claims

Column 25, Claim 8, Lines 1 and 2: "generate downscaled version of the image data has a bit depth of 16 bits." to read as —generate the downscaled version of the image data having a bit depth of 16 bits.—

Column 26, Claim 17, Line 27 and 28: "generate downscaled version of the image data has a bit depth of 16 bits." to read as —generate the downscaled version of the image data having a bit depth of 16 bits.—

Signed and Sealed this  
Sixteenth Day of March, 2021

Drew Hirshfeld  
*Performing the Functions and Duties of the  
Under Secretary of Commerce for Intellectual Property and  
Director of the United States Patent and Trademark Office*